United States Patent [19]

Janssen

[11] Patent Number: 4,996,743
[45] Date of Patent: Mar. 5, 1991

[54] MOLD PLATE DRIVE LINKAGE

[75] Inventor: Wilbur A. Janssen, New Lenox, Ill.

[73] Assignee: Formax, Inc., Mokena, Ill.

[21] Appl. No.: 471,398

[22] Filed: Jan. 29, 1990

[51] Int. Cl.⁵ .............................................. A27C 7/00
[52] U.S. Cl. .................................... 425/236; 426/513; 425/579
[58] Field of Search .......................... 17/32; 426/513; 425/236, 579

[56] References Cited

U.S. PATENT DOCUMENTS

| | | | |
|---|---|---|---|
| Re. 30,096 | 9/1979 | Richards | 17/32 |
| 1,504,490 | 8/1924 | Mason | 74/583 |
| 3,474,491 | 10/1969 | Holly | 17/32 |
| 3,887,964 | 6/1975 | Richards | 17/32 |
| 3,892,143 | 7/1975 | Kleister | 74/583 |
| 4,054,967 | 10/1977 | Sandberg et al. | 17/32 |
| 4,182,003 | 1/1980 | Lamartino et al. | 17/32 |
| 4,257,145 | 3/1981 | Bovino | 17/32 |
| 4,317,259 | 3/1982 | Wagner | 17/32 |
| 4,329,828 | 5/1982 | Wagner | 17/32 |
| 4,516,291 | 5/1985 | Goldberger et al. | 17/32 |
| 4,780,931 | 11/1988 | Powers et al. | 17/32 |

Primary Examiner—Willis Little
Attorney, Agent, or Firm—Kinzer, Plyer, Dorn, McEachran & Jambor

[57] ABSTRACT

An improved drive linkage for a reciprocating mold plate in a food patty molding machine includes, in series, a hydraulic cylinder and its piston; one is connected to a motor or other prime mover and the other to the mold plate. Three hydraulic lines connect the opposite ends of the cylinder to a large hydraulic reservoir and to each other. A hydraulic pressure flow directing means, preferably comprising check valves in the hydraulic lines, produces a continuous, unidirectional flow of hydraulic fluid from the reservoir into one end of the cylinder, on to the other end of the cylinder, and then back to the reservoir; the flow remains unidirectional despite cyclic reversal of the direction of piston movement in the cylinder.

8 Claims, 3 Drawing Sheets

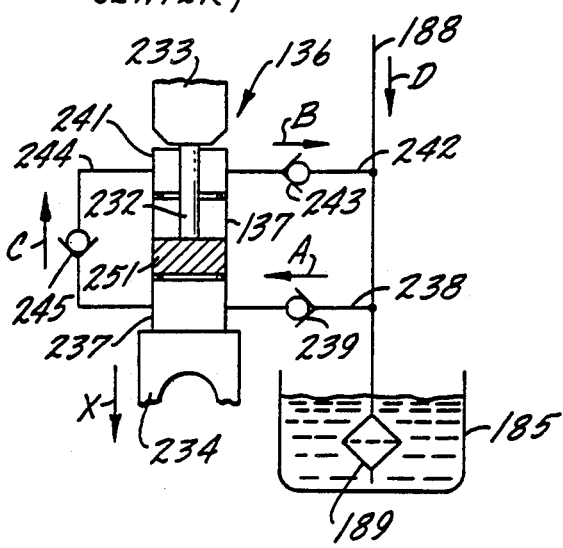
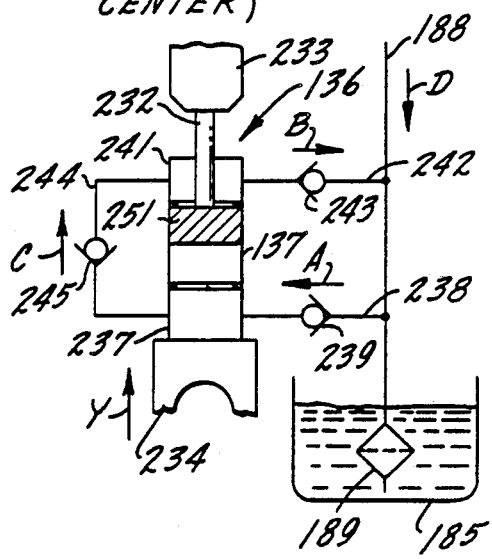

MOLD PLATE DRIVE LINKAGE

BACKGROUND OF THE INVENTION

Since the early 1970s, very large numbers of hamburgers and other food patties have been produced by large, high speed, high volume food patty molding machines. In these machines, a mold plate having a plurality of mold cavities that extend through the plate is moved reciprocably between a fill position and a discharge position at high cyclic rates, as high as ninety cycles per minute. At the fill position, ground meat or other food product is pumped into the cavities in the mold plate to form food patties. At the discharge position, knockout cups push the food patties out of the mold plate onto a takeaway conveyor.

The prototype for machines of this kind, and probably the fastest, highest volume commercial food patty molding machine, is the machine described and claimed in Richards U.S. Pat. No. 3,887,964, issued June 10, 1975, subsequently replaced by U.S. Reissue Patent No. Re. 30,096 issued Sept. 18, 1979. That particular machine has been commercially available from Formax, Inc. of Mokena, Ill., first as the Model F-24 machine and currently as the Model F-26 machine. The Richards machines utilize hydraulic drives for the food pumps and for other machine functions. In commercial practice, these machines have employed electric drive motors for reciprocation of the mold plate, but hydraulic drive motors could also be used. Other commercially successful machines of this general type are disclosed in Sandberg et al U.S. Pat. No. 4,054,967 issued Oct. 25, 1977 and LaMartino et al U.S. Pat. No. 4,182,003 issued Jan. 8, 1980.

In the Formax F-26 machines, as disclosed in U.S. Pat. No. 3,887,964 and as made and sold commercially, a hydraulic cylinder has been incorporated in a drive linkage for the reciprocal mold plate, between the mold plate and a prime mover. This hydraulic cylinder has a dual purpose; it serves as a shock absorber for the mold plate, which has substantial weight and which must accelerate and decelerate rapidly in moving back and forth between its fill and discharge positions. The hydraulic cylinder also serves to establish momentary stationary "dwells" for the mold plate at both its fill position and its discharge position. This is done to allow time for filling of the mold cavities at the fill position and for discharging the completed food patties at the discharge position. The hydraulic cylinder in this linkage has been connected to a small local fluid reservoir, and hydraulic fluid has been supplied to the cylinder from the reservoir by the pumping action of the movement of the piston within the cylinder.

This hydraulic cylinder drive linkage of U.S. Pat. No. 3,887,964 and the commercial Formax F-24 and F-26 machines, however, has been a continuing source of technical difficulties since the first machines went into service in the early 1970s. Any leakage from the cylinder itself or from any of the connections to the local reservoir rapidly depletes the small oil supply in that reservoir. When this occurs, the cylinder begins to "hammer" and rapidly self-destructs. The hydraulic cylinder and its oil reservoir cannot dissipate heat adequately. Nor is it possible to have effective filtering to preclude contamination of the hydraulic fluid from metal particles or water. The lack of heat dissipation results from the small size of the hydraulic fluid reservoir and the small volume of hydraulic fluid that is displaced in each cycle of the piston in the cylinder. The small quantity of oil movement and the reversal in its direction of movement makes effective filtering quite difficult. Effective maintenance is also inhibited by the fact that the oil reservoir is quite small; maintenance personnel have a tendency to fill it with whatever oil or other substance is most readily available.

SUMMARY OF THE INVENTION

It is a principal object of the invention, therefore, to provide a new and improved mold plate drive linkage for a food patty molding machine which effectively overcomes the problems and disadvantages of prior art drive linkages as described above.

A more specific object of the invention is to provide a new and improved hydraulic mold plate drive linkage for a food patty molding machine that affords a continuous flow of hydraulic fluid from a reservoir (preferably a large reservoir) to one end of a hydraulic cylinder in the linkage, then to the other end of that cylinder, and then back to the reservoir, all at minimal expense, so that there is a continuous directed flow of hydraulic fluid through the drive linkage, effectively eliminating or minimizing heat loss, hydraulic fluid leakage, and contamination problems.

Accordingly, the invention relates to an improvement in a mold plate drive linkage for a food patty molding machine, which machine comprises a mold plate, having a mold cavity therein, reciprocally movable between a fill position at which a mold cavity in the mold plate is filled to form a food patty and a discharge position at which the food patty is discharged, a motor, and a drive linkage, connecting the motor to the mold plate, for driving the mold plate reciprocally between its fill and discharge positions. The improved drive linkage comprises a hydraulic cylinder, a piston mounted within the hydraulic cylinder, a piston rod rod extending into one end of the cylinder and affixed to the piston, and a hydraulic fluid reservoir. First and second hydraulic lines hydraulically connect the opposite ends of the cylinder to the hydraulic fluid reservoir whereas a third hydraulic line connects the opposite ends of the cylinder. The linkage further comprises hydraulic pressure flow directing means, connected in at least one of the hydraulic lines, for directing and limiting flow through each of those lines to a single direction, so that hydraulic fluid is pumped from the reservoir into one end of the cylinder, from that one end of the cylinder to the other, and from the other end of the cylinder back to the reservoir in each cycle of the mold plate.

BRIEF DESCRIPTION OF THE DRAWINGS

FIG. 2 is a schematic diagram of the hydraulic drive linkage with the elements in the positions shown in FIG. 1;

FIG. 4 is a schematic diagram like FIG. 2 but with the mechanism in the condition of FIG. 3; and FIG. 5 is a schematic diagram, like FIG. 2, of another embodiment of the invention.

DESCRIPTION OF THE PREFERRED EMBODIMENTS

Figure 1:
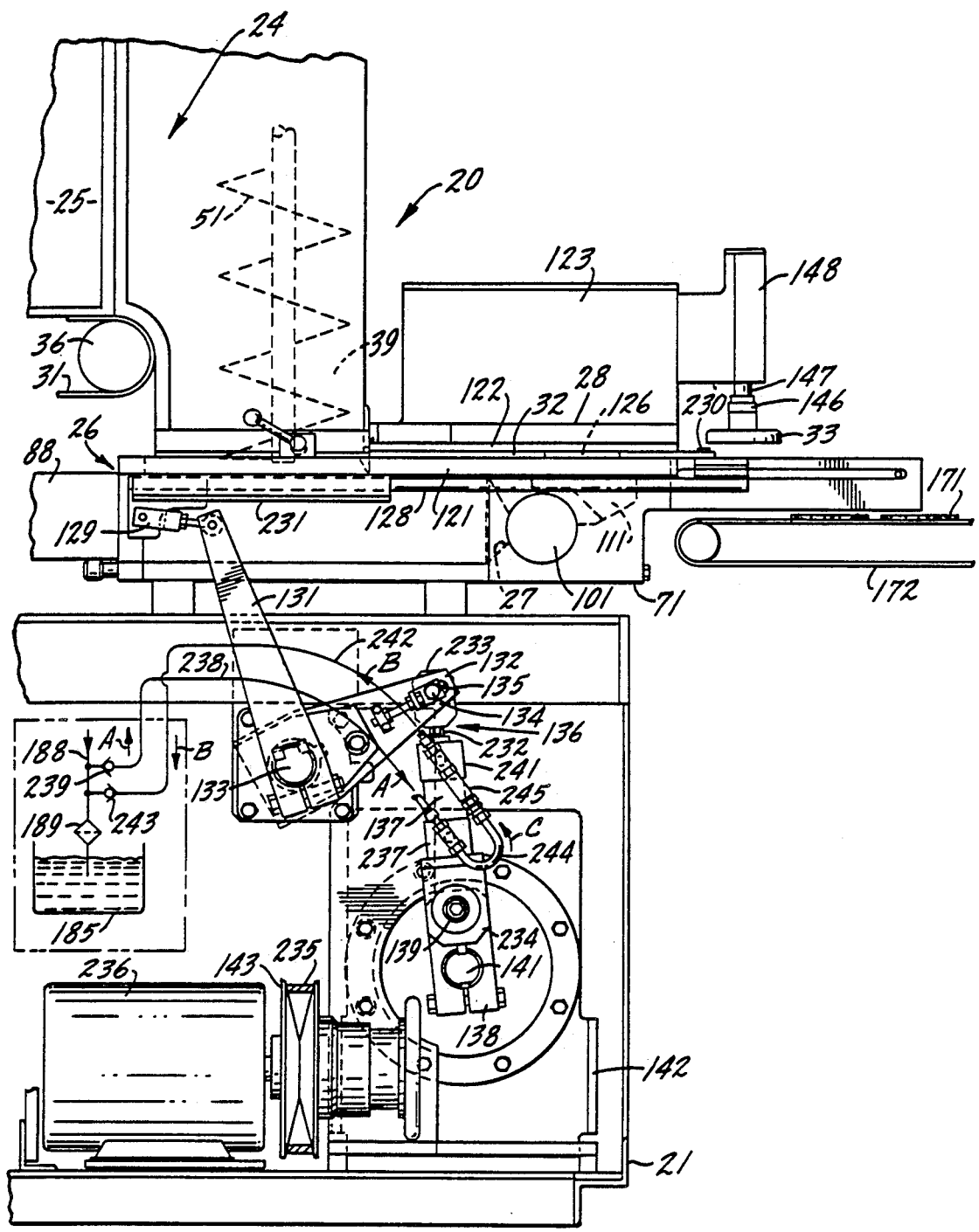
FIG. 1 is an elevation view, partly in cross section and partly schematic, of a high volume food patty molding machine incorporating an improved hydraulic drive linkage constructed in accordance with a preferred embodiment of the present invention, the machine being shown with its mold plate a fill position.

FIG. 1 illustrates a portion of a high speed, high volume food patty molding machine 20 of the kind utilizing a reciprocable mold plate, in which an improved mold plate drive linkage constructed in accordance with the invention is incorporated. The food patty molding machine 20, as shown, is of the type described and illustrated in detail in Richards U.S. Pat. No. 3,887,964 and its successor, Richards U.S. Reissue Pat. No. Re. 30,096; those patents are incorporated herein by reference. Other food patty molding machines, if equipped with an appropriate mold plate drive, can also use the present invention; see Sandberg et al U.S. Pat. No. 4,054,967, LaMartino et al U.S. Pat. No. 4,182,003, and Sandberg U.S. Pat. No. 4,768,260.

Figure 3:
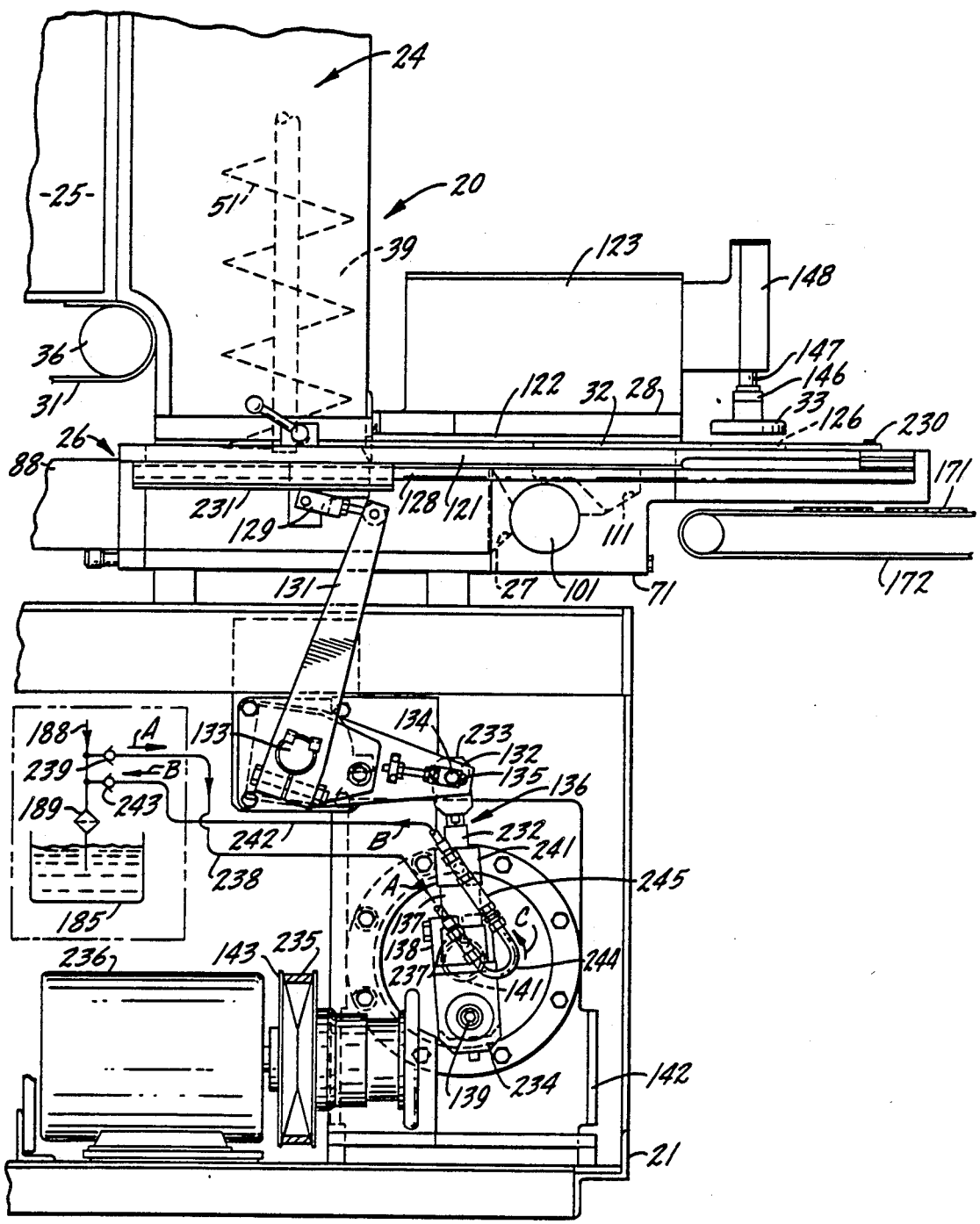
FIG. 3 is an elevation view, like FIG. 1, of principal components of the mold plate drive but with the mold plate in its discharge position.

The food patty molding machine 20, FIGS. 1 and 3, includes a machine base 21, usually mounted on rollers, and a supply means 24 for supplying a moldable food material such as ground beef, fish, poultry, or the like, to the processing mechanism of the machine. The food material supply means 24 includes a large storage hopper 25 that opens into the intake of a food pump system 26 which preferably includes two food pumps (a single pump may be utilized). The food pump system 26 pumps food, under pressure, into a manifold 27 in a housing 71. Manifold 27 is connected through a valve cylinder 101 and a feed passage 111 to the fill station of a cyclically operable molding mechanism 28.

The cyclically operable molding mechanism 28 of machine 20 includes a mold plate 32 that is reciprocably movable between a fill position (FIG. 1) and a discharge position (FIG. 3). Mold plate 32 includes a plurality of mold cavities 126 that are aligned with a series of knockout cups 33 located above the discharge position of the mold plate (FIG. 3). The knockout cups 33 are supported from a knockout support member 146 carried by two rods 147 disposed in individual housings 148. The housings 148 are a part of a knockout mechanism housing 123.

A conveyor belt 31 extends across the bottom of food hopper 25 and around a drive roller 36. The forward end of food hopper 25 extends into a vertical pump feed opening 39 that serves as the outlet for the food hopper and the inlet for the food pump system 26. One or more vertical feed screws 51 in passage 39 impel the food material downwardly through the passage and into the food pump system 26, which includes at least one and preferably a pair of hydraulically driven pump plungers 88.

Molding mechanism 28 includes a support plate 121 that comprises the top of housing 71; mold plate 32 is disposed upon a flat, smooth, mold plate support surface on the top of plate 121. Feed passage 111 extends through support plate 121. Above mold plate 32 there is a cover plate 122; as shown, cover plate 122 actually comprises two successive plates, one over the other. Appropriate spacers (not shown) maintain a fixed spacing between plates 121 and 122 so that mold plate 32 slides in a close fit between the stationary plates. A drive rod 128 extends along the side of machine 20, parallel to the path of movement of mold plate 32 (compare FIGS. 1 and 3). The forward or right-hand end of drive rod 128 is connected to the mold plate as indicated at 230. There is a second drive rod 128 on the opposite side of molding machine 20. The two drive rods are guided in their movements by appropriate fixed guides 231.

A swing link 129 is connected to rod 128 at the end opposite its connection 230 to the mold plate. The other end of link 129 is pivotally connected to a rocker arm 131 which, with a second arm 132, forms a crank pivoted on a rocker shaft 133. At the outer end of crank arm 132 there is a spring-loaded connection, comprising a pin 134 engaged in an elongated slot 135, affording a connection to a link 233. These members are all part of a drive linkage or connecting rod assembly 136.

Drive linkage 136 includes a hydraulic cylinder 137 having its lower end mounted on a crank arm or link 234. A piston rod 232 projects out of the upper end of cylinder 137 and is affixed to link 233. Link 234 is connected to a crank arm 138 by a crank pin 139. Crank arm 138 is mounted on the output shaft 141 of a gear reducer 142 driven through a variable speed drive, represented by a pulley 143 and drive belt 235, from a mold plate drive motor 236.

As thus far described, the food patty molding machine 20 corresponds to the machine described in Richards U.S. Pat. No. 3,887,964 and to the F-24 and F-26 machines manufactured and sold by Formax, Inc. Accordingly, only a brief description of operation is necessary.

Assuming that machine 20 starts with mold plate 32 in the fill position, FIG. 1, food pumps 88 pump food product through manifold 27 and its valve cylinder 101, and through fill passage 111 to fill the mold cavities 126 in the mold plate. This filling action for the mold cavities occurs with mold plate 32 stationary at the position illustrated in FIG. 1 and with crank arm 138 at its top dead center position as shown. The shaft 141 on which crank arm 138 is mounted rotates in a clockwise direction, as seen in FIG. 1. As the crank leaves its top dead center position, it first pulls cylinder 137 downwardly with respect to a piston 251 located within the cylinder (FIG. 2); piston 251 is connected to rod 232. While this is happening, the larger crank 131, 132 (FIG. 1) does not move.

With continued clockwise motion of shaft 141 and crank arm 138, the available length of travel for the piston within cylinder 137 is taken up (this travel is only slightly over an inch) so that link 233 is pulled downwardly. This begins a clockwise rotation of arm 132 about rocker shaft 133, producing a corresponding clockwise motion of rocker arm 131. This begins the movement of drive rods 128 and mold plate 32 from the fill position shown in FIG. 1 to the discharge position shown in FIG. 3. As crank arm 138 reaches its bottom dead center position, the mold plate is in its discharge position. At this juncture, the knockout mechanism comprising cups 33 is actuated to knock molded patties 171 out of the mold plate and onto a takeaway conveyor 172.

At the discharge position, FIG. 3, the patty molding mechanism again has a dwell interval. This interval is determined by the initial movement of crank arm 138 beyond bottom dead center, which pushes cylinder 137 up around its piston 251 (see FIG. 4) without beginning upward displacement of the free end of crank arm 132, FIG. 3. Subsequently, however, when the available range of travel for the piston within cylinder 137 has been used up, the continued clockwise motion of crank arm 138 caused by continuing rotation of shaft 141 drives rod 232 and link 233 upwardly and begins a counterclockwise rotation of crank 131,132 back to the fill position of the patty molding machine. When mold plate 32 has been returned to its fill position, FIG. 1, the cycle starts over again.

Patty molding machine 20 incorporates a hydraulic drive for its food pump plungers 88. That hydraulic drive system includes a large storage tank 185 for hydraulic fluid, shown schematically in FIGS. 1 and 3. See FIG. 18 in U.S. Pat. No. 3,887,964 for a complete hydraulic drive for the food pumps. That hydraulic system includes a main return line 188 to tank 185, with a filter 189 interposed in return line 188. Tank 185, line 188, and filter 189 are shown schematically in FIGS. 1 and 3; they are located in a part of base 21 that is not included in the drawing.

In the preferred drive linkage of the present invention, FIGS. 1-4, the lower end 237 of cylinder 137 is connected to the hydraulic return line 188 by a first hydraulic line 238. A check valve 239 is interposed in line 238 so that hydraulic fluid can flow through line 238 only in the direction of arrows A. Similarly, the upper end 241 of cylinder 137 is connected to the hydraulic return line 188 through a second hydraulic line 242 in which there is a check valve 243 that limits flow in line 242 to the direction indicated by arrows B. To complete the linkage, there is a third hydraulic line 244 that connects the opposite ends 237 and 241 of cylinder 137. This third hydraulic line 234 includes a check valve 245 that limits the flow of hydraulic fluid in line 244 to the direction of the arrow C. The directions of movement for link 237 are indicated in FIGS. 2 and 4, by arrows X and Y.

Starting from the top dead center position for crank arm 138 and link 234 that is shown in FIGS. 1 and 2, the crank and link 234 begin to move downwardly in the direction of arrow X (FIG. 2). At first, as cylinder 137 is pulled down, because it is mounted on link 234 its piston 251 is effectively displaced relative to the cylinder. This pumps a limited quantity of hydraulic fluid out of the upper end 241 of cylinder 137 through line 242 in the direction of arrow B. The hydraulic fluid cannot be pumped back through line 244 to the lower end 237 of cylinder 137, due to the presence of check valve 245 in line 244. Consequently, the pumping action of piston 251 draws additional fluid from reservoir 185, line 188, and line 238 through check valve 239 into the lower end 237 of the cylinder. This pumping action by piston 251 continues until the piston reaches the end of its stroke within cylinder 137. Until that time, link 233 remains essentially stationary. This is the fill position dwell for the mold plate because, with link 233 stationary, there is no movement of the crank 131, 132 that drives mold plate 32.

Once piston 251 reaches the limit of its stroke within the cylinder 137, however, continued downward movement of link 234 (arrow X, FIG. 2) pulls link 233 downwardly, due to the connection between piston 251 and link 233 afforded by rod 232. As the output shaft 141 of gear reducer 142 continues to rotate in a clockwise direction, continuing the downward movement of link 234, the mold plate is driven to its discharge position, FIGS. 3 and 4.

At the bottom dead center position for crank arm 138 and link 234, shown in FIGS. 3 and 4, a similar action occurs. Continuing clockwise rotation of the gear reducer output shaft begins to drive crank arm 138 and link 234 upwardly; see arrow Y in FIG. 4. Initially, this displaces cylinder 137 relative to its piston 251 without moving link 233. The relative downward movement of piston 251 within cylinder 137 pumps hydraulic fluid out through line 244 and valve 245 from the lower end 237 of the cylinder to its upper end 241. The fluid cannot be pumped back to reservoir 185 through line 238 due to the presence of check valve 239. Also, the upper end 241 of cylinder 137 cannot draw oil from the reservoir through line 242 due to the presence of check valve 243 in that line.

Once piston 251 has reached the lower end of its travel in cylinder 137, effected because the cylinder is being moved upwardly by link 234, the continued upward movement of link 234 and cylinder 137 drive the upper link 233 upwardly to pivot crank 131,132 counterclockwise and drive mold plate 32 from its discharge position (FIG. 3) back to its fill position (FIG. 1). The interval of relative movement between cylinder 137 and piston 251 and pumping of hydraulic fluid as described above establishes the necessary dwell period at the discharge position to enable knockout cups 33 to push patties 171 out of mold plate 32 down onto conveyor 172. This completes the mold plate cycle, which begins again at the fill position of FIG. 1.

From the foregoing description, it will be apparent that in each cycle of mold plate 32, a cycle that goes from the top deadcenter position of FIGS. 1 and 2 to the bottom deadcenter position of FIGS. 3 and 4 and back to the initial top deadcenter position, a limited quantity of hydraulic fluid is pumped from reservoir 185 through line 238 into the lower end 237 of cylinder 137, out through the hydraulic line 244 to the upper end 241 of cylinder 137 and then back to reservoir 185 through line 242. Check valves 238, 243, and 245 restrict the flow of the hydraulic fluid to this particular path. That is, the hydraulic fluid is constrained to flow in the directions indicated by arrows A, C and B; the check valves preclude any reverse flow. As a consequence, in each cycle of mold plate 32 a limited quantity of fresh hydraulic fluid is drawn into the lower end 237 of cylinder 137 (arrow A) and subsequently is pumped up into the upper end 241 of the cylinder (arrow C) and out to the return line 188 to reservoir 185 (arrow B). In this way the hydraulic fluid in cylinder 137 is continuously replenished while molding machine 20 remains in operation. The oil or other hydraulic fluid is kept clean and cool so that the problems and difficulties regularly encountered with the previous arrangement, discussed above, are effectively eliminated.

FIGS. 1-4 show three separate check valves 237, 243, and 245 in the three hydraulic lines 238, 242 and 244 that provide the hydraulic fluid circuit described above. This is the preferred construction for the present invention. However, one of the check valves could be eliminated with only a small loss of efficiency. Thus, either check valve 239 or check valve 243 can be removed from the illustrated drive linkage; this would still leave the circulation loop for cylinder 137 limited to flow in the directions indicated by arrows A-C, so that replacement and replenishment of the hydraulic fluid, with continued operation of molding machine 20, would still be assured.

It is not essential that the first and second hydraulic lines connecting cylinder 137 to reservoir 185 complete those connections through the main drain line 188 for other hydraulic systems in machine 20 (the flow of fluid in line 88 is indicated by arrow D). This connection is made primarily because it is convenient. It also has the advantage that the filter 189 protects the hydraulic fluid stored in reservoir 185 from contamination if piston 251 begins to wear and deposit metal particles in the hydraulic fluid passing through cylinder 137. However, a direct connection to reservoir 185, not using the main return line 188, can be utilized if preferred. If this expedient is adopted, an additional filter should be included in the system.

FIG. 5 illustrates another drive linkage or connecting rod assembly 236 comprising a further embodiment of the invention. As before, linkage 236 includes a hydraulic cylinder 137 having its lower end 237 mounted upon link 234. The piston 251 within cylinder 137 is again connected, by a rod 232, to link 233. In the mold plate drive linkage 236, the lower end 237 of cylinder 137 is connected to reservoir 185 by a first hydraulic line 338 in which a small pump 341 is interposed. The upper end 241 of cylinder 137 is returned to reservoir 185 by a second hydraulic line 342 in which there is a filter 389. A third hydraulic line 344 connects the two opposite ends 237 and 241 of hydraulic cylinder 137.

The mold plate drive linkage 236 of FIG. 5 functions in much the same way as the linkage 136 of FIGS. 1–4, even though the check valves have been eliminated; pump 341 makes the difference because it restricts the flow in the three hydraulic lines to the directions indicated by arrows A, B and C. Thus, pump 341 maintains a small pressure differential in line 338, so that the pressure is slightly higher in the portion of that line that connects to cylinder end 237 than in the part of the line that leads from reservoir 185 to the pump. As long as this condition is maintained, the oil or other hydraulic fluid from reservoir 185 cannot flow backwards through the lines, opposite to the arrows. Rather, the pumping action of piston 251 proceeds as described above for FIGS. 1–4. In every cycle of the mold plate drive there is a small quantity of hydraulic fluid circulated to and through cylinder 137 and back to reservoir 185.

In linkages 136 and 236, as described above, cylinder 137 is affixed to the top of link 234 and piston 251 is connected to link 233 by rod 232. However, this arrangement is not essential. Thus, the illustrated alignment for cylinder 137 and its piston 251 can be reversed from top to bottom so that end 237 of the cylinder is affixed to the link 233 and the piston rod 232 is secured to link 234. With respect to the linkage 236 shown in FIG. 5, pump 341 need not be located in the first hydraulic line 338. It can be positioned in any of the three hydraulic lines. It is not essential to use any check valves in the embodiment of FIG. 5 and none are shown; however, the presence of a check valve, as in line 342, would certainly not be detrimental and might well be advantageous in operation of the cushioned drive linkage.

What is claimed is:

1. An improved mold plate drive linkage for a food patty molding machine, which machine comprises
a mold plate, having a mold cavity therein, reciprocally movable between a fill position at which a mold cavity in the mold plate is filled to form a food patty and a discharge position at which the food patty is discharged, a motor, and a drive linkage, connecting the motor to the mold plate, for driving the mold plate reciprocally between its fill and discharge positions, the improved drive linkage comprising:
a hydraulic cylinder;
a piston, mounted within the hydraulic cylinder;
a piston rod, extending into one end of the cylinder and affixed to the piston;
a hydraulic fluid reservoir;
first and second hydraulic lines hydraulically connecting the opposite ends of the cylinder to the hydraulic fluid reservoir;
a third hydraulic line connecting the opposite ends of the cylinder;
and hydraulic pressure flow directing means, connected in at least one of the hydraulic lines, for directing and limiting flow through each of those lines to a single direction, so that hydraulic fluid is pumped from the reservoir into one end of the cylinder, from that one end of the cylinder to the other end of the cylinder, and from the other end of the cylinder back to the reservoir in each cycle of the mold plate.

2. An improved drive linkage for a food patty molding machine according to claim 1 in which the hydraulic pressure flow directing means comprises two check valves, one in the third hydraulic line and the other in one of the first and second hydraulic lines.

3. An improved drive linkage for a food patty molding machine according to claim 1, for a patty molding machine including a food pump system, a hydraulic drive for the food pump system, and a large main hydraulic fluid reservoir for the food pump system drive, in which the hydraulic fluid reservoir for the mold plate drive linkage is the main hydraulic fluid reservoir.

4. An improved drive linkage for a food patty molding machine according to claim 3, for a patty molding machine having a main return line from the food pump system drive back to the main reservoir and having a filter interposed in the main return line, in which the second hydraulic line is connected back to the main hydraulic reservoir through the main return line.

5. An improved drive linkage for a food patty molding machine according to claim 4 in which both of the first and second hydraulic lines are connected to the main reservoir through the main return line.

6. An improved drive linkage for a food patty molding machine according to claim 4 in which the hydraulic pressure flow directing means comprises two check valves, one in the third hydraulic line and the other in one of the first and second hydraulic lines.

7. An improved drive linkage for a food patty molding machine according to claim 4 in which the hydraulic pressure flow directing means comprises three check valves, one in each of the three hydraulic lines.

8. An improved drive linkage for a food patty molding machine according to claim 1 in which the flow directing means comprises a pump interposed in one of the hydraulic lines.

* * * * *